Oct. 2, 1951        J. L. PORTER        2,569,779
METHOD AND APPARATUS FOR QUENCHING MOLTEN MATERIAL
Filed Aug. 22, 1947
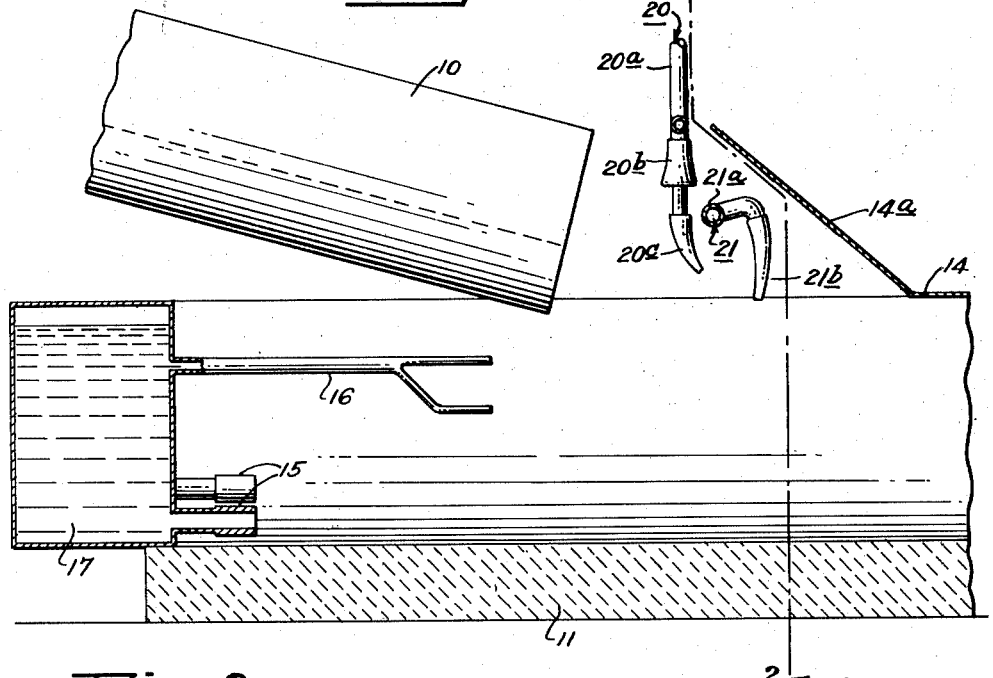
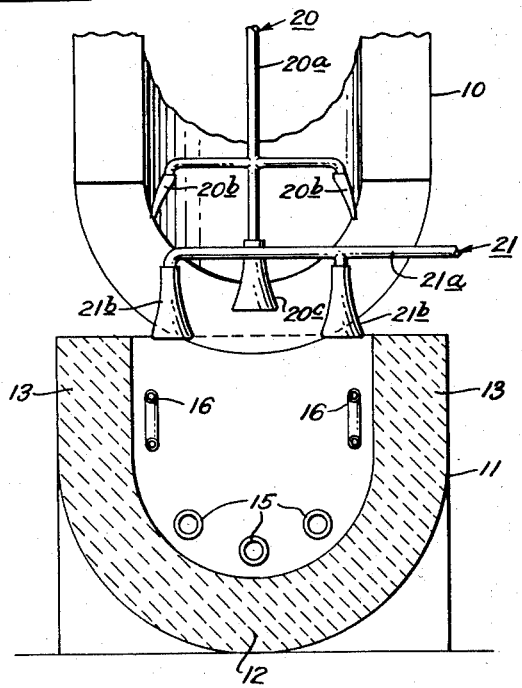
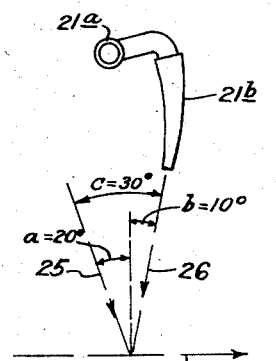
INVENTOR.
JOHN L. PORTER
BY *James E. Toomey*
AGENT Patented Oct. 2, 1951

2,569,779

UNITED STATES PATENT OFFICE 2,569,779

METHOD AND APPARATUS FOR QUENCHING MOLTEN MATERIAL

John L. Porter, Palo Alto, Calif., assignor, by mesne assignments, to Kaiser Aluminum & Chemical Corporation, a corporation of Delaware Application August 22, 1947, Serial No. 770,042

3 Claims. (Cl. 18—2.4)

This invention relates to an improvement in the method of and apparatus for producing soluble phosphates from insoluble phosphates by their fusion with addition agents to make products high in available $P_2O_5$ content and having fertilizer value.

Natural phosphate rock is of little value as a soil fertilizer because of the type of phosphate compounds contained therein. The principal phosphate compound in the rock is crystalline fluorapatite having the formula $CaF_2.3Ca_3(PO_4)_2$. The phosphate in this compound is not available to plant life so the fluorapatite structure must be broken down into soluble phosphate compounds to make it available.

A method of doing this has been described in the Journal of Industrial and Engineering Chemistry, volume 35, 1943, at pages 774 to 777. In this method, the ground fusion mixture consisting of phosphate rock and olivine, or magnesia and silica mixed in the desired proportions, was melted in an electric furnace. The resulting melt was water-quenched by allowing it to flow into a high-velocity stream of water flowing in a trough.

The conventional methods of and apparatus for water-quenching, involving the addition of the body of molten material to a stream of flowing water, when applied to the present process, fall short of achieving the best results. Although these methods of quenching cool the melt to produce a coarse granular material, their quenching action is not sufficiently rapid to prevent an appreciable reversion or reformation of compounds having low $P_2O_5$ availabilities. The reformation of apatite and other insoluble compounds having low $P_2O_5$ availabilities, is evidenced by the presence of excessive proportions of crystalline material in the quenched product produced by these conventional methods.

It is an object of the present invention to provide an efficient and economic method and apparatus for the production of phosphatic material having fertilizer value, and having higher available $P_2O_5$ contents than similar materials produced by prior art methods and apparatus. It is an additional object of the invention to provide an improved method and apparatus for quenching and granulating fused phosphatic materials to produce substantially amorphous products of high $P_2O_5$ availabilities. It is a particular object of the present invention to provide a method and apparatus for more rapidly water-quenching fused phosphatic materials, produced by fusing phosphate rock with mineral magnesium silicates, and thereby preventing the reformation of fluorapatite. A still further object is to provide an improved method and improved apparatus for rapidly quenching and granulating molten solids in general.

These and other objects of the invention will become apparent from the following description.

According to the present invention, a molten solid such as results from the fusion of phosphate rock with magnesia- and silica-containing minerals, is poured onto a rapidly flowing stream of quenching water and is simultaneously struck at the junction of the streams of slag and quenching water by a stream or streams of water directed under high pressure at an angle such as to create a high degree of turbulence at said junction.

The method and apparatus of the invention will be better understood by reference to the accompanying drawings, in which Figure 1 is a side elevation, partly in cross-section, showing the tap trough, the quenching trough and the nozzle arrangement;

Figure 2 is a vertical section of the apparatus taken along the line 2—2 of Figure 1, and illustrates primarily the nozzle arrangement; and Figure 3 is an enlarged detail view of one set of nozzles of Figures 1 and 2, also showing diagrammatically the courses of several streams of material.

Referring to the drawings, a tap-trough 10 is inclined at an angle over a quenching-trough generally designated as 11. The tap-trough 10 and quenching trough 11 may be of any suitable construction; for example, they may be constructed of steel lined with refractory brick. Tap-trough 10 may also be provided with cooling pipes (not shown) embedded in the refractory walls of the same.

Quenching-trough 11 is provided with a bottom portion 12, side portions 13 and roof 14. Roof 14 is provided with a slanting end portion 14a.

Quenching-trough 11 is further provided with a nozzle arrangement comprising bottom nozzles 15 and bifurcated side nozzles 16 communicating with water distribution box 17. Side nozzles 16 preferably terminate close to but short of the forward end of tap-trough 10, as shown, while bottom nozzles 15 may terminate farther back from this point. Bottom nozzles 15 are relatively much larger than side nozzles 16 and deliver a stream of water along bottom portion 12 of quenching trough 11. Side nozzles 16 deliver streams of water along side portions 13.

Two further sets of nozzles designated generally as 20 and 21 are located above quenching trough 11 close to the forward or discharge end of tap-trough 10. Set 20 comprises a conduit 20a which communicates with a source of water (not shown), a pair of auxiliary side nozzles 20b and roof nozzle 20c. Set 21 comprises a conduit or manifold 21a connected with a source of water (not shown) and a pair of granulating nozzles 21b. Each of the nozzles 20b, 20c and 21b is of dove-tail design so as to deliver an outwardly expanding sheet of water. Nozzles 20b are so positioned and set at such an angle as to deliver water sprays to the inside walls of side portions 13 of quenching-trough 11, at points near the top of said side portions. Nozzle 20c is so positioned and at such an angle as to deliver a water spray downwardly but at an angle such as to provide a continuous "roof" of water above the main quenching stream as explained hereinbelow. Nozzles 21b are so positioned and at such an angle as to deliver water sprays approximately directly downward as explained in greater detail hereinbelow.

In operation, molten slag is tapped from a furnace (not shown) and flows down tap-trough 10 into quenching-trough 11 while jets or sprays of water are being delivered to the quenching-trough through the various nozzles. The main stream of quenching water is delivered through bottom nozzles 15. Jets or sprays of water delivered to the sides of the quenching-trough by side nozzles 16 and 20b effectively wash and scour these surfaces, prevent contact of hot or molten slag therewith, prevent build-up of quenched slag on these surfaces and avoid clogging of the quenching-trough. A jet or spray of water is delivered by roof nozzle 20c at a suitable angle, e. g., 45°, in the direction of flow of material and effectively forms a "roof" over the mixture of hot slag and quenching water such as to prevent the slag from flying upwardly to roof 14, and knocks the slag back down into the quenching stream.

Meanwhile, a stream or streams of water from granulating nozzles 21b strikes downwardly at the slag. The performance and function of this stream of water, which is of particular importance will now be described with reference to Figure 3 of the drawings.

Referring to Figure 3, slag stream 25 and granulating stream 26 coincide at main quenching stream 27, the directions of flow being indicated by the arrows. The angle $a$ between the vertical and slag stream 25 is shown as 20° and the angle $b$ between granulating stream 26 and the vertical is shown as 10°, the total angle $c$ being 30°. In practice, of course, the slag and granulating streams will be curved, but the angles shown indicate approximately the angles at the point of junction of the several streams.

In practice, also, considerable variation of these angles is allowable. In general, however, the total angle $c$ will be 10° to 45° and preferably 25° to 35°; the horizontal components of the slag and granulating streams 25 and 26 will be oppositely directed; and the total angle $c$ will be such as to create a high degree of turbulence at the junction of the slag, granulating and quenching streams.

In the preferred embodiment of the invention, all of the several streams, jets and sprays of water are delivered under high pressure and at high velocity, e. g., at 100 to 130 pounds per square inch and a linear velocity of 110 to 125 feet per second, whereby great turbulence results and effective quenching, scouring, granulating, etc., occur.

Also, the greater bulk of water is supplied by bottom nozzles 15 and granulating nozzles 21b; that is, most of the volume of water consists of the main quenching and the granulating streams.

By way of example and to guide one skilled in the art, in quenching a slag produced by fusing a mixture of 0.7 part by weight of serpentine and 1.0 part by weight of phosphate rock, from a temperature of 2400° F. to a temperature 150° F., the slag was tapped from a furnace at the rate of 500 pounds per hour into a water-cooled tap-trough 7 feet long of U-shape cross-section having an internal width of 1.8 feet. The stream of slag issuing from the lower end of this tap-trough at about 2400° F. poured into a main stream of quenching water delivered at 65° F. and a pressure of 110 pounds per square inch. The ratio of quenching water in this main stream to slag was 2 gallons per pound of slag. The quenching-trough was U-shaped, having an internal width of 1.25 feet and a length of 55 feet, with the lower end of the tap-trough located 1.5 feet from rear end (nearer the furnace) of the quenching-trough. Meanwhile, water was delivered from side nozzles corresponding to nozzles 16 of the drawings and from auxiliary side nozzles and roof nozzles corresponding to similarly situated nozzles of the drawings. The supply of water from these nozzles, more or less evenly distributed among them, was at a pressure of 110 pounds per square inch and in the proportion of about 0.5 gallon per pound of slag. Also, granulating jets of water were delivered as indicated in the drawings at the same pressure and in the proportion of about 0.5 gallon per pound of slag.

By this means, the slag was rapidly quenched and granulated. The granular product was settled from the quenching water in a bowl classifier and additional water was allowed to drain from piles of the product. The dried granulated product contained 83% of minus 28 mesh material of very high $P_2O_5$ availability, being about 80% by the A. O. A. C. 2% citric acid method. By additional mechanical grinding the $P_2O_5$ availability was even further increased.

It will be appreciated that the particular conditions of operation, such as temperature of slag and of quenching water, proportions of each, and water pressure, as well as the design of apparatus, are susceptible of considerable variation to suit the tastes and convenience of the operator or engineer and to meet the exigencies of a particular situation. However, with the foregoing principles in mind and with the specific illustrative data provided herein, no difficulties beyond trial and error will be encountered by one skilled in the art.

Further, the method and apparatus of the invention, although applicable with particular advantage and with especially beneficial results to quenching slags resulting from fusing phosphate rock and magnesium silicates, are also applicable to quenching other molten solids. The method and apparatus of the invention have particular advantage in any case where it is desired to quench a molten solid rapidly and simultaneously to granulate or disintegrate the quenched product. Examples of other molten solids which may be quenched in apparatus and by the method of the invention are magnesium silicate glass, blast furnace slags, smelter slags, phosphate reduction furnace slags and fayalite.

What is claimed is:

1. An apparatus for quenching molten material which is vitreous when solid and for disintegrating the same, comprising a substantially horizontally disposed quenching conduit comprising side walls and a bottom portion, a plurality of nozzles for delivering high pressure streams of quenching water along said bottom portion, pouring means adapted to pour a stream of molten material onto said streams of quenching water at a small angle from the vertical, other nozzles positioned and adapted to direct streams of water enveloping the space above the streams of quenching water inculding the junction thereof with said molten material, and a plurality of nozzles positioned and adapted to deliver outwardly expanding high pressure sheets of water downwardly onto said streams of quenching water at the junction thereof with the molten material, said plurality of nozzles being further positioned and adapted to direct said sheets of water at a small angle from the vertical and to impart thereto a horizontal component opposite to that of the stream of molten material.

2. A method for quenching molten material which is vitreous when solid and for disintegrating the same which comprises flowing a stream of molten material onto a high pressure, high velocity substantially horizontally flowing stream of quenching water, said stream of molten material being directed at an angle from the vertical such that the horizontal component thereof is in the direction of flow of the stream of quenching water, directing a plurality of high pressure disintegrating streams of water downwardly onto the stream of molten material at its junction with the stream of quenching water, said disintegrating streams being directed at a small angle from the vertical such that the horizontal component thereof is opposite to the horizontal component of the stream of molten material thereby creating a high turbulence, and enveloping the space above the junction of the stream of quenching water with the stream of molten material with a plurality of streams of water to substantially enclose the zone of high turbulence, said last named plurality of streams being so directed as to substantially avoid contact thereof with the stream of molten material and the junction thereof with the stream of quenching water.

3. A method for rapidly cooling a molten slag produced by fusion of phosphate rock, and magnesia and silica containing materials to substantially simultaneously solidify and disintegrate the same to form amorphous granules and to avoid pseudo-crystalline formation due to slow cooling with resulting loss of available $P_2O_5$ which comprises, flowing a stream of molten slag onto a high pressure, high velocity stream of quenching water, said stream of molten material being directed at an angle from the vertical such that the horizontal component thereof is in the direction of flow of the stream of quenching water, directing a plurality of high pressure disintegrating streams of water downwardly onto the stream of molten material at its junction with the stream of quenching water, said disintegrating streams being directed at a small angle from the vertical such that the horizontal component thereof is opposite to the horizontal component of the stream of molten material thereby creating a high turbulence, and enveloping the space above the junction of the stream of quenching water with the stream of molten material with a plurality of streams of water to substantially enclose the zone of high turbulence, said last named plurality of streams being so directed as to substantially avoid contact thereof with the stream of molten material and the junction thereof with the stream of quenching water.

JOHN L. PORTER.

REFERENCES CITED

The following references are of record in the file of this patent:

UNITED STATES PATENTS

| Number | Name | Date |
|---|---|---|
| 1,502,793 | Maguet | July 29, 1924 |
| 1,865,367 | Gorsuch | June 28, 1932 |
| 2,124,768 | Drill et al. | July 26, 1938 |
| 2,126,411 | Powell | Aug. 4, 1938 |
| 2,330,038 | Ervin | Sept. 21, 1943 |

FOREIGN PATENTS

| Number | Country | Date |
|---|---|---|
| 359,406 | Great Britain | Oct. 16, 1931 |